United States Patent
Lee et al.

(10) Patent No.: US 10,608,339 B2
(45) Date of Patent: Mar. 31, 2020

(54) WIRELESS DEVICE WITH SHARED COIL

(71) Applicant: Samsung Electronics Co., Ltd., Suwon-si (KR)

(72) Inventors: Jaechun Lee, Seoul (KR); Jong Pal Kim, Seoul (KR); Young-Jun Hong, Seoul (KR); Joonseong Kang, Suwon-si (KR); Junyeub Suh, Seoul (KR); Wonseok Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 15/605,122

(22) Filed: May 25, 2017

(65) Prior Publication Data
US 2018/0138596 A1    May 17, 2018

(30) Foreign Application Priority Data

Nov. 16, 2016   (KR) .................. 10-2016-0152425

(51) Int. Cl.
*H01Q 7/00*       (2006.01)
*H02J 50/10*      (2016.01)
*H01F 38/14*      (2006.01)
*H01Q 5/335*      (2015.01)
*H01Q 1/12*       (2006.01)
*H04B 5/00*       (2006.01)
*H02J 50/80*      (2016.01)

(52) U.S. Cl.
CPC .............. *H01Q 7/00* (2013.01); *H01F 38/14* (2013.01); *H01Q 1/1242* (2013.01); *H01Q 5/335* (2015.01); *H02J 50/10* (2016.02); *H04B 5/0037* (2013.01); *H04B 5/0075* (2013.01); *H02J 50/80* (2016.02)

(58) Field of Classification Search
CPC .......... H01Q 7/00; H01Q 5/335; H01Q 1/242; H01Q 21/00; H04B 5/0037; H04B 5/0075
USPC ........................................................ 343/867
See application file for complete search history.

(56) References Cited

U.S. PATENT DOCUMENTS

| | | | |
|---|---|---|---|
| 8,487,745 B2 | 7/2013 | Kozuma et al. | |
| 8,682,261 B2 | 3/2014 | Ozaki et al. | |
| 9,246,351 B2 | 1/2016 | Ozaki et al. | |
| 9,985,607 B2 * | 5/2018 | Link | H03H 9/706 |
| 10,250,227 B2 * | 4/2019 | Kando | H03H 9/0004 |

(Continued)

FOREIGN PATENT DOCUMENTS

| | | |
|---|---|---|
| KR | 10-1350312 B1 | 1/2014 |
| WO | WO 2013/161953 A1 | 10/2013 |
| WO | WO 2015/120672 A1 | 8/2015 |

OTHER PUBLICATIONS

A. Khripkov et al., "Integrated Resonant Structure for Simultaneous Wireless Power Transfer and Data Telemetry", IEEE Antennas and Wireless Propagation Letters, pp. 1659-1662, Nov. 1, 2012 (4 pages, in English).

(Continued)

*Primary Examiner* — Huedung X Mancuso
(74) *Attorney, Agent, or Firm* — NSIP Law

(57) ABSTRACT

A wireless device including a coil having loops, a first reception circuit, and a second reception circuit. The first reception circuit is configured to receive a signal of a first frequency band through a portion of the loops and the second reception circuit configured to inhibit the signal of the first frequency band through the loops.

29 Claims, 18 Drawing Sheets

(56) References Cited

U.S. PATENT DOCUMENTS

| | | |
|---|---|---|
| 2011/0210805 A1* | 9/2011 | Link ............... H03H 9/547 333/134 |
| 2014/0066753 A1 | 3/2014 | Qian et al. |
| 2014/0327398 A1 | 11/2014 | Sato |
| 2014/0349572 A1 | 11/2014 | Ben-Shalom et al. |
| 2015/0123679 A1 | 5/2015 | Kuyvenhoven et al. |
| 2015/0130680 A1* | 5/2015 | Link ............... H03H 9/547 343/852 |
| 2015/0221785 A1 | 8/2015 | Cheng |
| 2015/0222129 A1 | 8/2015 | McCauley et al. |
| 2016/0020600 A1 | 1/2016 | Mori et al. |
| 2016/0087689 A1 | 3/2016 | Fukaya |
| 2016/0099601 A1 | 4/2016 | Leabman et al. |
| 2016/0204619 A1* | 7/2016 | Lin ............... H02J 5/005 307/104 |
| 2016/0308395 A1 | 10/2016 | Jeong et al. |

OTHER PUBLICATIONS

Extended European Search Report dated Mar. 9, 2018 in Corresponding European Patent Application 17184377.4 (7 pages in English).

\* cited by examiner

WIRELESS DEVICE WITH SHARED COIL

CROSS-REFERENCE TO RELATED APPLICATION

This application claims the benefit under 35 USC 119(a) of Korean Patent Application No. 10-2016-0152425 filed on Nov. 16, 2016, in the Korean Intellectual Property Office, the entire disclosure of which is incorporated herein by reference for all purposes.

BACKGROUND

1. Field

The following description relates to a wireless device with a shared coil.

2. Description of Related Art

With the development of wireless power transmission technology and communication technology such as near field communication or Bluetooth, an electronic device, for example, a mobile terminal, requires antenna devices that operate in various different frequency bands.

In a case in which the electronic device includes a plurality of antenna modules, the electronic device may transmit and receive wireless power and wireless signals of various frequency bands, with an increased data and wireless power transmission rates. However, electronic devices are restricted to the number of antenna modules they may include due to lack of space for the antenna modules.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a wireless device including a coil that includes a plurality of loops, a first reception circuit configured to receive a signal of a first frequency band through a portion of the plurality of loops, and a second reception circuit configured to block the signal of the first frequency band through the plurality of loops.

The first reception circuit and the second reception circuit may be connected to the coil to share at least a portion of the coil.

The second reception circuit may be configured to receive a signal of a second frequency band, the second frequency band having a lower frequency domain than the first frequency band.

The first reception circuit may be configured to inhibit a signal of a second frequency band, the second frequency band having a lower frequency domain than the first frequency band.

At least a portion of the coil may be disposed to receive magnetic flux of a first direction, and a remaining portion of the coil may be disposed to receive magnetic flux of a second direction which is different from the first direction.

The remaining portion of the coil may be disposed to receive the magnetic flux of the second direction that is orthogonal to the first direction.

The coil may include a loop configured to receive magnetic flux of a first direction and a loop configured to receive magnetic flux of a second direction, and the second reception circuit may be configured to block the signal of the first frequency band from an external signal received through the coil, using the loop configured to receive the magnetic flux of the second direction.

The first reception circuit may include a band-stop filter (BSF) configured to prevent an inflow of wireless power into the first reception circuit, the power transmitted through the second frequency band, by blocking a signal of a second frequency band which is distinct from the first frequency band.

The second reception circuit may include a band-stop filter (BSF) configured to prevent an inflow of wireless data having a frequency in the first frequency band from flowing into the second reception circuit, the data transmitted through the first frequency band, by blocking the signal of the first frequency band.

The second reception circuit may be configured to prevent current flow corresponding to the signal of the first frequency band, and pass current flow corresponding to a signal of a second frequency band which is distinct from the first frequency band.

The first reception circuit may be configured to pass a current flow corresponding to the signal of the first frequency band, and prevent a current flow corresponding to a signal of a second frequency band which is distinct from the first frequency band.

The second reception circuit may include a circuit configured to operate as an impedance value greater than a threshold impedance value in response to reception of the signal of the first frequency band, and operate as an impedance value less than or equal to the threshold impedance value in response to reception of a signal of a remaining band which is distinct from the first frequency band.

The second reception circuit may include a resonant circuit having a center frequency of the first frequency band as a resonant frequency.

The second reception circuit may include a conducting wire having a length equal a quarter ¼ wavelength of a center frequency of the first frequency band, and connected to the plurality of loops, and a capacitor connected between the conducting wire and a ground.

The coil may include a conducting wire having a length equal a quarter ¼ wavelength of a center frequency of the first frequency band.

A first portion and a second portion of the coil connected to the second reception circuit may be disposed to be electrically symmetric about the first reception circuit, and a third portion of the coil connected to the first reception circuit may be disposed at an electrical center of the coil.

The first reception circuit may be connected to a portion of the plurality of loops electrically symmetric about a virtual ground of the coil in the coil, and the second reception circuit may include a capacitor configured to connect two points electrically symmetric about the virtual ground of the coil in the coil.

The first reception circuit may be connected to a portion of the plurality of loops electrically symmetric about a virtual ground of the coil in the coil, and the second reception circuit may include a first capacitor connected in parallel with at least one loop of the coil, and a second capacitor connected in parallel with at least one loop of the coil such that the first capacitor and the second capacitor are electrically symmetric about the virtual ground.

The wireless device may further include a third reception circuit configured to receive a signal of a third frequency band which is distinct from the first frequency band through the portion of the plurality of loops.

The first reception circuit may be connected to the portion of the plurality of loops, and the second reception circuit may be connected to the coil to share at least a portion of the portion of the plurality of loops with the first reception circuit.

At least a portion of the coil may be disposed on a first layer of a circuit board, and a remaining portion of the coil may be disposed on a second layer which is distinct from the first layer in the circuit board.

The second layer may include a magnetic material that disrupts a flow of a magnetic flux.

The second layer may be disposed between a third layer and the first layer to magnetically isolate the third layer and the first layer.

At least a portion of the coil disposed to receive a magnetic flux of a first direction and a remaining portion of the coil disposed to receive a magnetic flux of a second direction which is different from the first direction may be disposed horizontally on the same layer.

In another general aspect, there is also provided a wireless device including a coil that includes a plurality of loops, and a plurality of reception circuits configured to receive external signals through the coil. Each of the plurality of reception circuits may be configured to receive a signal of a band designated for each of the plurality of reception circuits, and block a signal of a remaining band using at least a portion of the plurality of loops, among the external signals.

In another general aspect, a wireless device includes a coil configured to receive a frequency band. A first loop of the coil coupled to a first reception circuit to receive a first set of frequencies of the frequency band. A second loop of the coil coupled to a second reception circuit to inhibit the first set of frequencies of the frequency band.

The wireless device may further include a third loop of the coil coupled to a third reception circuit to receive a third set of frequencies of the frequency band.

The first loop may be configured to receive Wireless power transfer and the second loop is configured as an RF antenna.

Other features and aspects will be apparent from the following detailed description, the drawings, and the claims.

Figure 1:
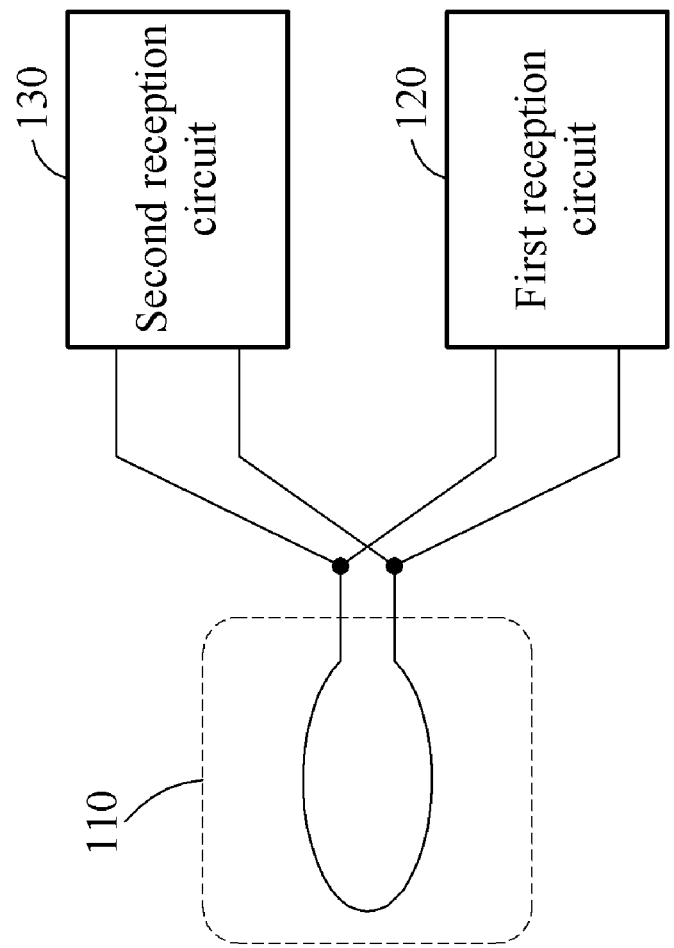
FIG. 1 illustrates an example of a configuration of a wireless device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates an example of a configuration of a wireless device.

Referring to FIG. 1, a wireless device 100 includes a coil 110, a first reception circuit 120, and a second reception circuit 130.

The coil 110 is a passive device having a conductor wire having an inductance wound into a plurality of loops. Each of the plurality of loops may have a circular shape but examples are not limited thereto and may have a polygonal shape, for example. The coil 110 operates as an antenna and receives magnetic flux corresponding to a central axis direction of the coil 110. The coil 110 generates a current flow in response to the received magnetic flux.

The first reception circuit 120 receives a signal of a first frequency band through a portion of the plurality of loops. The first reception circuit 120 is connected to the portion of the plurality of loops, and receives the signal of the first frequency band through the portion of the plurality of loops. The first reception circuit 120 inhibits a signal of a second frequency band which is distinct from the first frequency band. The portion of the plurality of loops corresponds to at least one loop of the plurality of loops constituting the coil 110. The first and second frequency bands are each delimited by a lower frequency and an upper frequency.

The second reception circuit 130 inhibits the signal of the first frequency band through the plurality of loops. The second reception circuit 130 is connected to the plurality of loops, for example, the entire coil 110, to inhibit the signal of the first frequency band. The second reception circuit 130 includes a capacitor connected to at least a portion of the loops. The second reception circuit 130 inhibits the signal of the first frequency band using a frequency response characteristic of its circuit. Further, the second reception circuit 130 receives the signal of the second frequency band, which is distinct from the first frequency band.

As described above, the first reception circuit 120 and the second reception circuit 130 share the plurality of loops of the coil 110, and each of the first reception circuit 120 and the second reception circuit 130 is connected to at least a portion of the plurality of loops of the coil 110. Thus, the wireless device 100 uses a portion of the coil 110 as an antenna for reception of the first frequency band, for example, a 433 megahertz (MHz) band as a radio frequency (RF). Another portion of the coil 110 is used for the second frequency band, for example, a 13.56 MHz band as wireless power transmission. Using the coil 110 as an antenna and a wireless power transmission device allows for further miniaturization of the wireless device 100. For example, the first reception circuit 120 is implemented as a high-pass filter (HPF) that includes a capacitor, and the second reception circuit 130 is implemented as a resonant circuit or a resistor-capacitor (RC) circuit. Thus, the functions of the first reception circuit 120 and the second reception circuit 130 are realized using a few number of components, thereby increasing efficiency.

Further, the second reception circuit 130 prevents a decrement in transmission and reception efficiency by preventing an inflow of a signal of the first frequency band into the second reception circuit 130. The second reception circuit 130 prevents power consumption by the signal of the first frequency band. In a case in which a signal of the first frequency band is received through a portion of the plurality of loops, the second reception circuit 130 inhibits generation of current to offset effects of the signal of the first frequency band at a remaining portion of the plurality of loops.

Thus, the first reception circuit 120 and the second reception circuit 130 share portions of the coil 110, and the first reception circuit 120 acts to isolate the signal of the second frequency band and the second reception circuit 130 acts to isolate the signal of the first frequency band.

Figure 2:
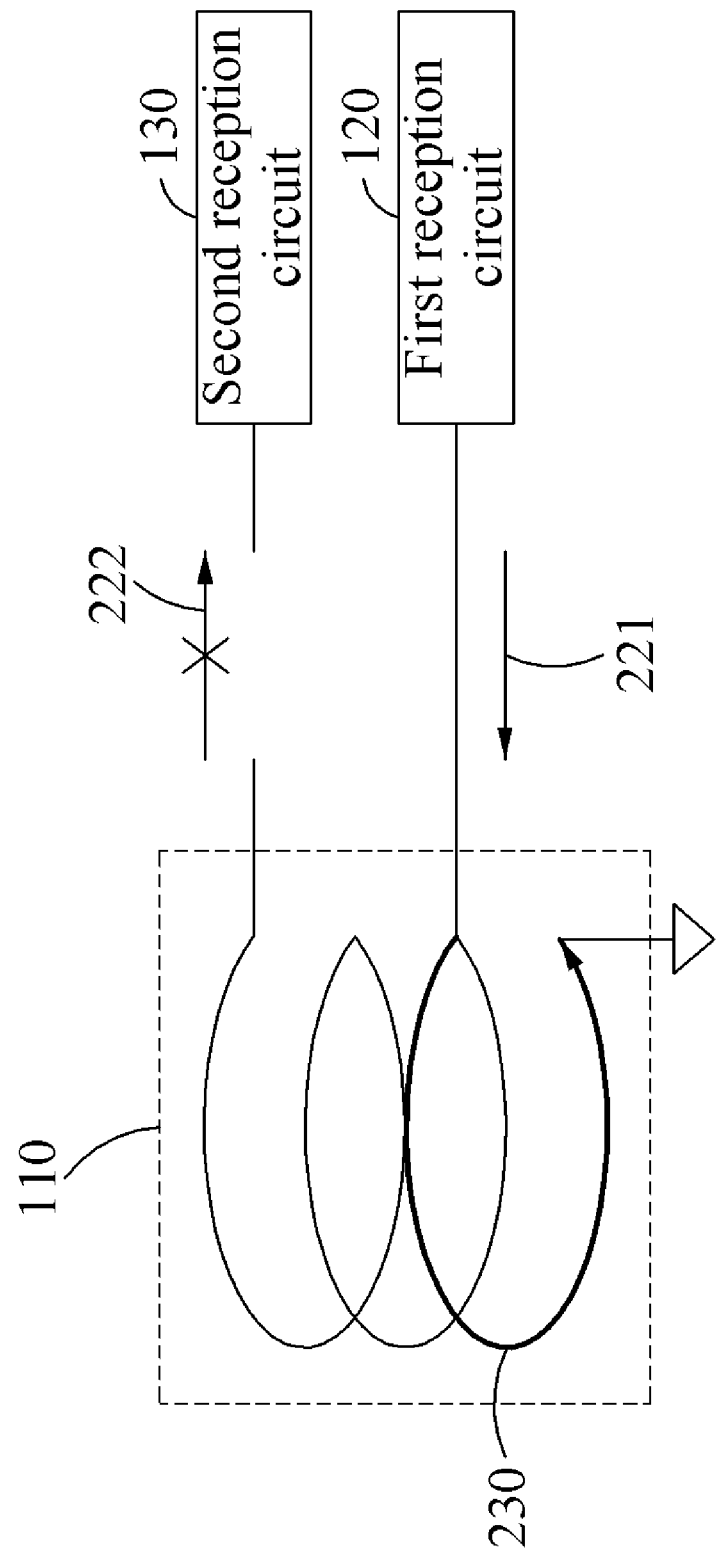
FIG. 2 illustrates an example of an operation of a wireless device in a first frequency band.

FIG. 2 illustrates an example of an operation of a wireless device in a first frequency band.

The wireless device 100 receives an external signal through the coil 110. The external signal includes a signal of a predetermined frequency band. For example, the wireless device 100 receives a signal of a first frequency band or a signal of a second frequency band through the coil 110. The received frequency band through the coil 110 may change based on the number of loops in the coil 110, the length of the coil 110, and the number of windings. For example, when the first reception circuit 120 is connected to a fewer number of loops than the second reception circuit 130, the first reception circuit 120 receives the signal of the first frequency band which has a higher frequency than the second frequency band received by the second reception circuit 130.

In response to reception of the signal of the first frequency band, the coil 110 generates a current flow 221 and a current flow 222 corresponding to the signal of the first frequency band. Further, in response to reception of the signal of the second frequency band, the coil 110 generates a current flow corresponding to the signal of the second frequency band.

The first reception circuit 120 passes the signal and the current flow 221 corresponding to the first frequency band. Here, the first reception circuit 120 is connected to a first portion 230 of the plurality of loops of the coil 110, and receives the signal of the first frequency band using the first portion 230.

The second reception circuit 130 inhibits the signal of the first frequency band and prevents the current flow 222 corresponding to the signal of the first frequency band. Here, the second reception circuit 130 prevents an inflow of the current flow 222 into the second reception circuit 130. The prevented current flow 222, which increases efficiency by preventing power wastage, is generated in response to the first reception circuit 120 receiving the signal of the first frequency band through the first portion 230 of the plurality of loops. For example, the second reception circuit 130 is a circuit configured to open a connected electrical path with respect to the signal of the first frequency band and close the electrical path with respect to the signal of the second frequency band.

In response to reception of the signal of the second frequency band through the coil 110, the first reception circuit 120 prevents the current flow corresponding to the signal of the second frequency band, which is distinct from the first frequency band. Conversely, in response to reception of the signal of the second frequency band through the coil 110, the second reception circuit 130 passes the current flow corresponding to the signal of the second frequency band which is distinct from the first frequency band.

Thus, each of the first reception circuit 120 and the second reception circuit 130 receives only a signal of a band assigned thereto. Further, each of the first reception circuit 120 and the second reception circuit 130 opens its circuit in response to reception of a signal of a band not assigned thereto, thereby reducing unnecessary power consumption.

Although FIG. 2 illustrates a case in which the entire first portion 230 connected to the first reception circuit 120 is used by the second reception circuit 130, examples are not limited thereto. For example, the first reception circuit 120 may be connected to the first portion 230 of the coil 110, and the second reception circuit 130 may be connected to the coil 110 to share at least a portion of the first portion 230 with the first reception circuit 120. Thus, the portion of the coil 110 connected to the first reception circuit 120 and the portion of the coil 110 connected to the second reception circuit 130 are partially shared.

FIGS. 3 through 6 illustrate configurations of second reception circuits.

A second reception circuit 330, 530 includes a circuit configured to operate at an impedance greater than a threshold impedance of the coil 110 in response to reception of a signal of a first frequency band, and operate at an impedance less than or equal to the threshold impedance of the coil 110 in response to reception of a signal of the remaining frequency band that is distinct from the first frequency band.

Figure 3:
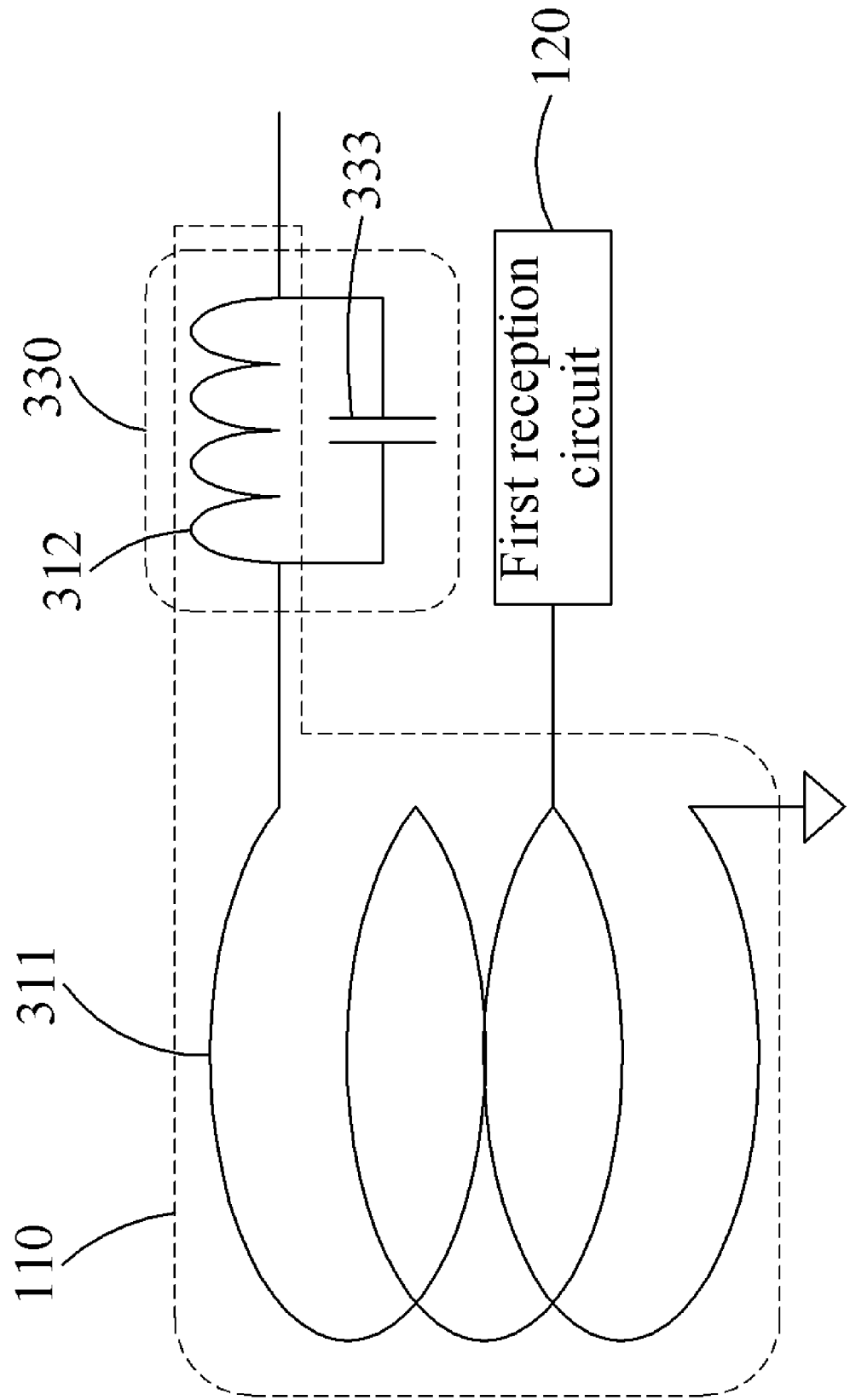
FIGS. 3, 4, 5 and 6 illustrate examples of configurations of second reception circuits.
Figure 4:
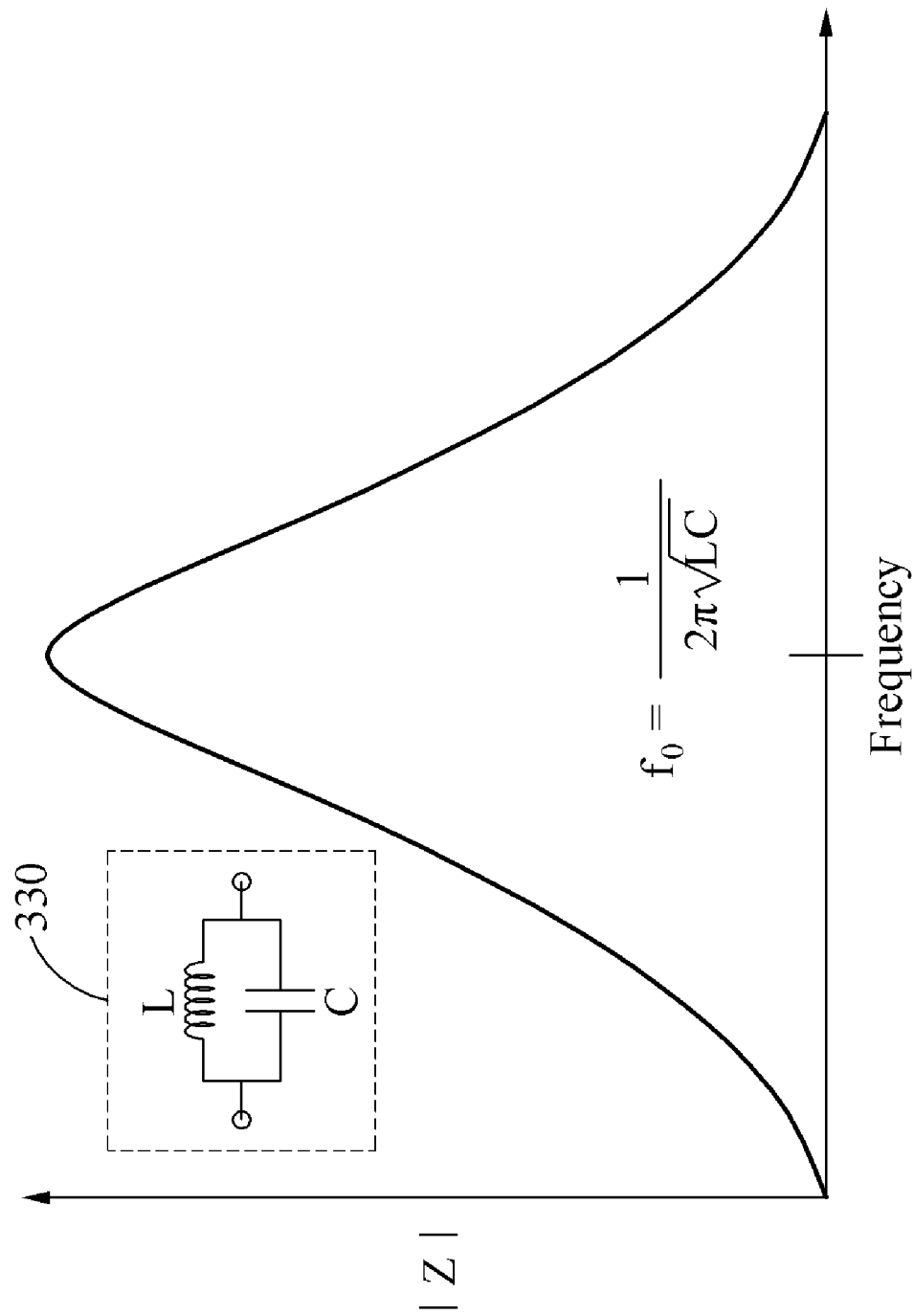

Referring to FIGS. 3 and 4, the second reception circuit 330 includes a resonant circuit having a resonant frequency that is aligned with a center frequency of the first frequency band. The resonant circuit is a circuit that includes an inductor 312 and a capacitor 333 that are connected in parallel. As shown in FIG. 4, the second reception circuit 330 is a resonant circuit having maximum impedance at a resonant frequency of $$f_0 = \frac{1}{2\pi\sqrt{LC}}.$$

Here, L denotes an inductance of the inductor 312, and C denotes a capacitance of the capacitor 333. The second reception circuit 330 is designed such that the resonant frequency of the resonant circuit equals to the center frequency of the first frequency band. Thus, the second reception circuit 330 operates such that both ends of the resonant circuit are open in response to reception of the signal of the first frequency band.

A portion 312 of the coil 110 operates as the inductor 312 included in the second reception circuit 330. The remaining portion 311 of the coil 110 operates as an antenna that receives an external wireless signal. Further, the direction of the magnetic flux to be received by the portion 312 of the coil 110 and a direction of a magnetic flux to be received by the remaining portion 311 of the coil 110 are designed to differ from each other, which will be described further with reference to FIGS. 7 through 10.

Figure 5:
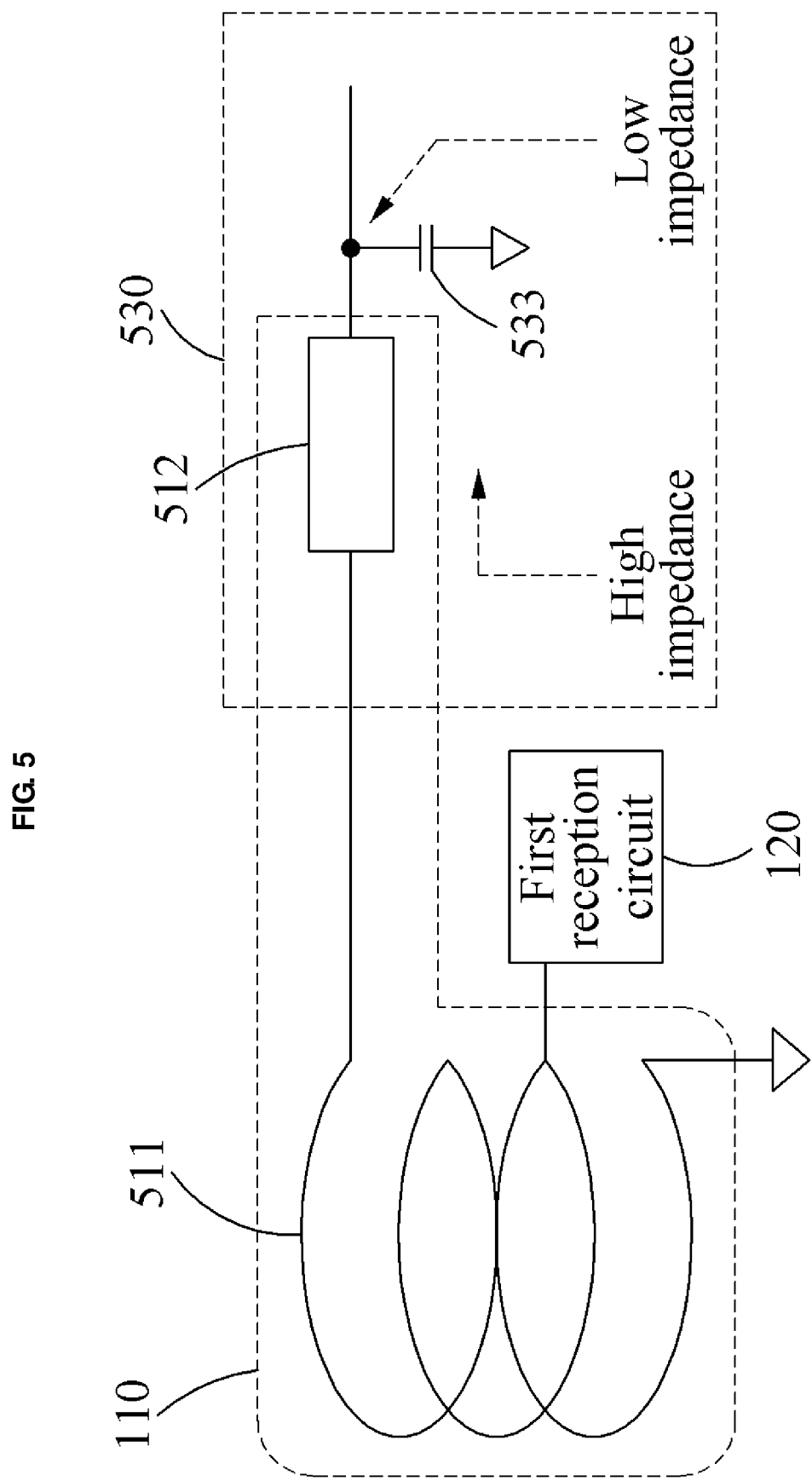
Figure 6:
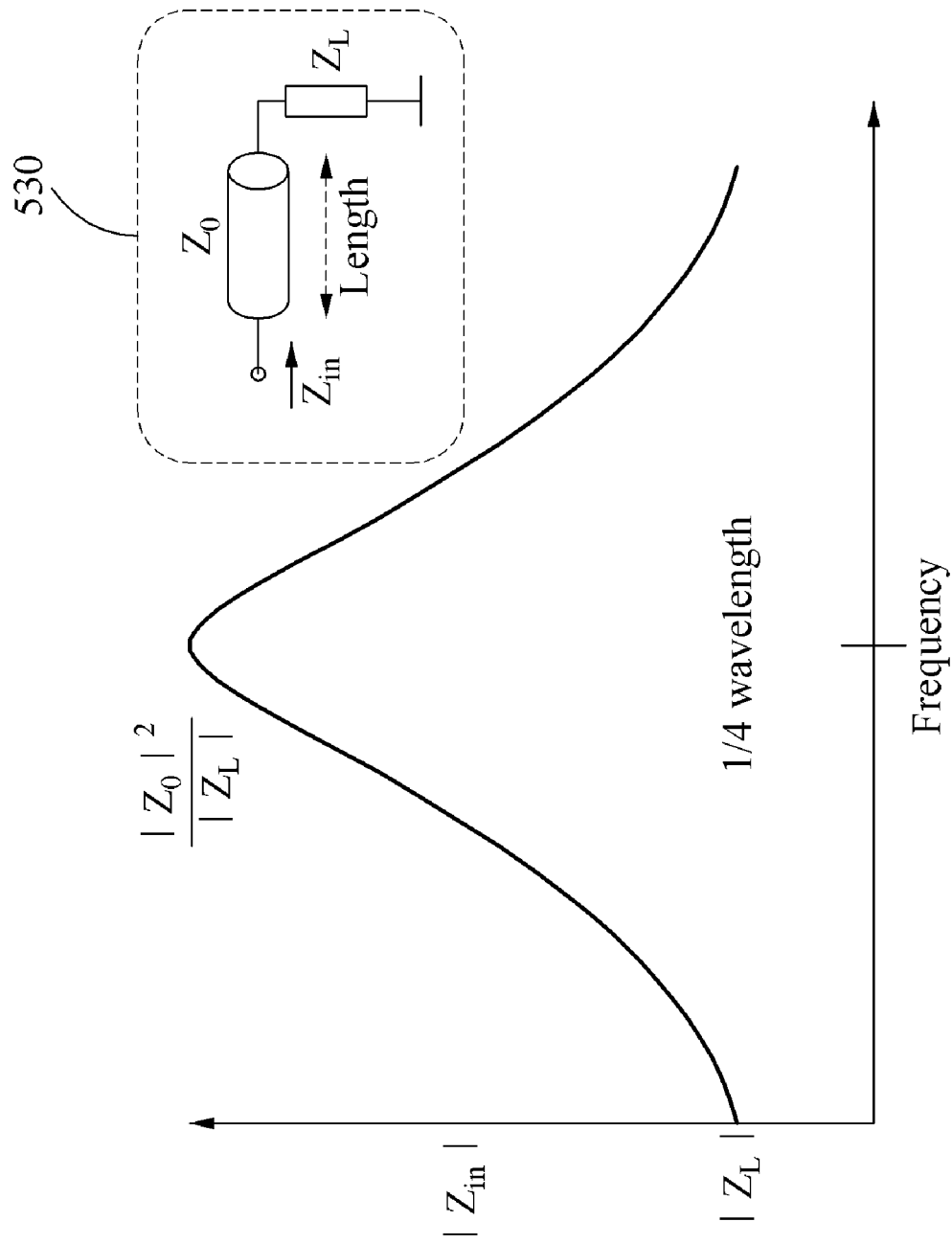

Referring to FIGS. 5 and 6, the second reception circuit 530 includes a conducting wire 512 having a length that's equal to a quarter (¼) wavelength of a center frequency of the first frequency band and connected to loops 511 of the coil 110, and a capacitor 533 connected between the conducting wire 512 and a ground terminal. The second reception circuit 530 is a circuit configured to have maximum impedance when the length of the conducting wire 512 is equal to ¼ of a wavelength of the received signal. As shown in FIG. 6, when the length of the conducting wire 512 is equal to ¼ of the wavelength of the signal, the maximum impedance of the second reception circuit 530 is $$Z_{in} = \frac{Z_0^2}{Z_L}.$$

Here, $Z_0$ denotes an impedance of the conducting wire 512, and $Z_L$ denotes an impedance of a load including the capacitor 533. $Z_{in}$ denotes an input impedance with respect to the second reception circuit 530 from the coil 110. The second reception circuit 530 has a relatively high impedance with respect to the coil 110, and has a relatively low impedance with respect to the load in the first frequency band.

In FIG. 5, for ease of description, the coil 110 is divided into an antenna 511 portion and the conducting wire 512 portion; however, examples are not limited thereto. The coil 110 includes the conducting wire 512 having a length equal to ¼ of the wavelength of the center frequency of the first frequency band. For example, the loops 511 of the coil 110 operate as the conducting wire 512 included in the second reception circuit 530. Thus, the coil 110 receives the external signal, as the antenna, through the loops 511, and simultaneously prevents an inflow of the signal of the first frequency band into the second reception circuit 530 since the coil 110 has a relatively high input impedance in the first frequency band through the conducting wire 512.

FIGS. 7 through 10 illustrate coil structures of wireless devices.

To receive magnetic fluxes from multiple directions, a coil includes a loop configured to receive magnetic flux in multiple directions. For example, a portion of the coil is disposed to receive magnetic flux in a first direction and the remaining portion of the coil is disposed to receive magnetic flux in a second direction, which is different from the first direction. Here, the remaining portion of the coil is disposed to receive the magnetic flux in the second direction orthogonal to the first direction. Although, it is described that the coil receives the magnetic flux of the first direction and the magnetic flux of the second direction, examples are not limited thereto. The coil may receive magnetic fluxes of n directions. Here, n is an integer greater than or equal to "1".

Further, a second reception circuit 130 inhibits a signal of a first frequency band from an external signal received through the coil, using the loop configured to receive the magnetic flux of the second direction, which will be described in detail with reference to FIGS. 7 through 10.

Figure 7:
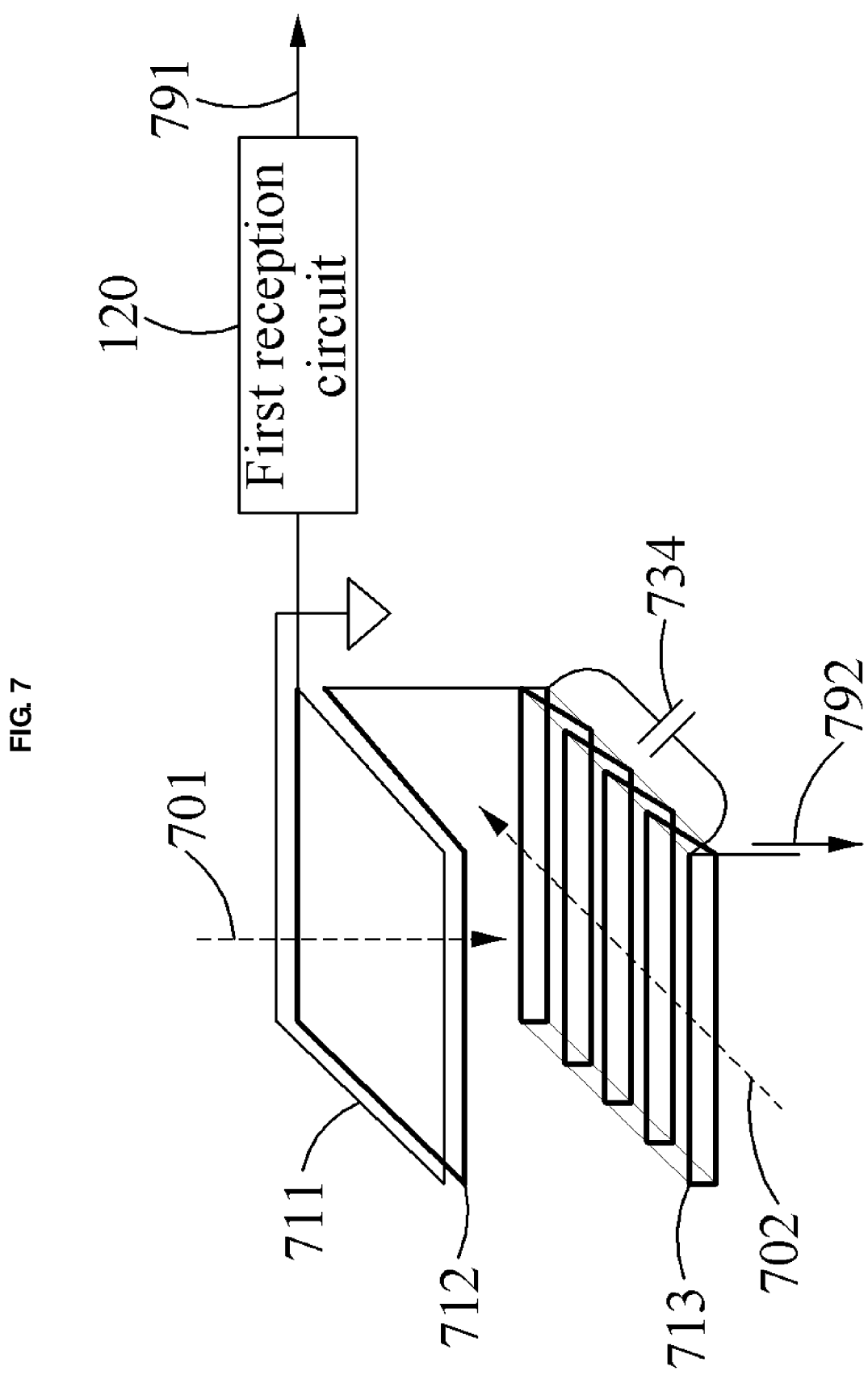
FIGS. 7, 8, 9 and 10 illustrate examples of coil structures of wireless devices.

FIG. 7 illustrates an example of a coil structure of the circuit described with reference to FIGS. 3 and 4.

Referring to FIG. 7, a coil of a wireless device includes loops 711 and 712 formed with respect to a reference axis corresponding to a first direction, for example, a first axis. The coil also includes a loop 713 differently oriented from loops 711 and 712. The loop 713 is formed with respect to a reference axis corresponding to a second direction, for example, a second axis. The first axis may be orthogonal to the second axis. The wireless device receives a magnetic flux 701 of the first direction through the loops 711 and 712 formed with respect to the first axis, and receives a magnetic flux 702 of the second direction through the loop 713 formed with respect to the second axis.

The first reception circuit 120 is connected to the loop 711 formed with respect to the first axis, and passes a signal 791 of a first frequency band received through the loop 711.

A second reception circuit 330 is connected to the loops 711 and 712 formed with respect to the first axis and the loop 713 formed with respect to the second axis. The second reception circuit 330 receives a signal 792 of a second frequency band through the loops 711, 712, and 713. Here, the second reception circuit 330 includes the loop 713 configured to receive the magnetic flux of the second direction and a capacitor 734 connected in parallel with the loop 713. For example, among the plurality of loops 711, 712 and 713 of the coil, a portion of the remaining loops 712 and 713 not connected to the first reception circuit 120, that is, the loop 713, is connected in parallel with the capacitor 734. The second reception circuit 330 operates as the resonant circuit described with reference to FIGS. 3 and 4 through the loop 713 configured to receive the magnetic flux of the second direction and the capacitor 734. Thus, the second reception circuit 330 inhibits the signal 791 of the first frequency band from the external signal received through the coil.

The first reception circuit 120 and the second reception circuit 330 are provided in a multilayer structure which is implemented on different layers. At least a portion of the coil, for example, a portion shared between the first reception circuit 120 and the second reception circuit 330, that is, the loop 711, is disposed on a first layer of a circuit board, and a remaining portion of the coil, for example, a portion dedicated only to the second reception circuit 330, that is, the loop 713, is disposed on a second layer that is distinct from the second layer in the circuit board. For example, the second layer includes a magnetic material that disrupts a flow of a magnetic flux, for example, ferrite. Here, the second layer is disposed between a third layer and the first layer to magnetically isolate the third layer and the first layer.

In FIG. 7, a resonant circuit including the loop 713 formed with respect to the second axis and the capacitor 734 connected in parallel with the loop 713 is implemented through a board including the magnetic material such as ferrite. A circuit for signal processing is disposed below the board on which the resonant circuit is implemented. Thus, the board including the magnetic material on which the resonant circuit is implemented, is disposed between the circuit for signal processing and the loops 711 and 712 configured to receive the magnetic flux of the first direction, thereby magnetically isolating the circuit for signal processing and the loops 711 and 712.

Figure 8:
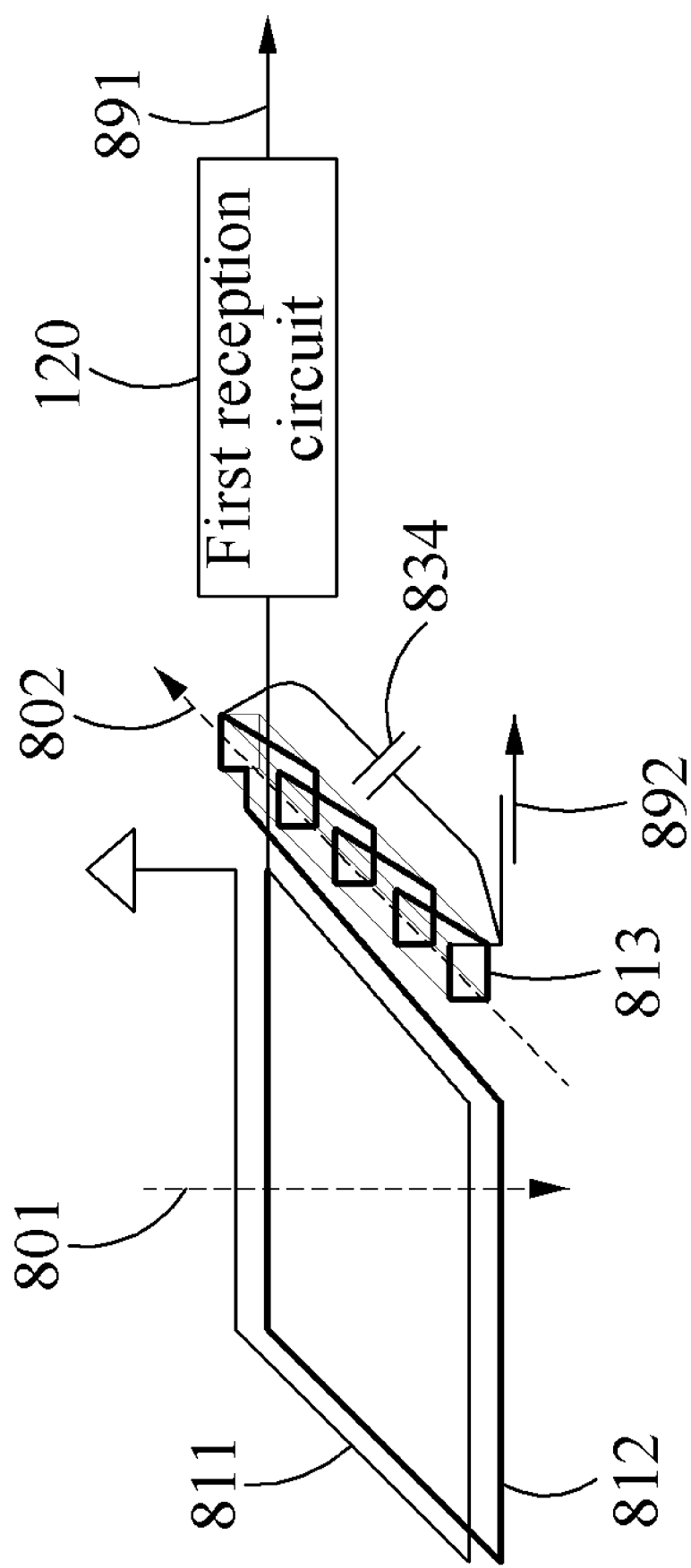

FIG. 8 illustrates an example of a coil structure of the circuit described with reference to FIGS. 3 and 4.

Referring to FIG. 8, the coil includes loops 811 and 812 formed with respect to a first axis, and a loop 813 formed with respect to a second axis. The loops 811 and 812 receive magnetic flux 801 of a first direction, and the loop 813 receives magnetic flux 802 of a second direction. The first direction may be orthogonal to the second direction. Similar to the example of FIG. 7, a second reception circuit 330 includes the loop 813 formed with respect to the second axis and a capacitor 834 connected in parallel with the loop 813 to inhibit a signal 891 of a first frequency band and receive a signal 892 of a second frequency band. The first reception circuit 120 passes the signal 891 of the first frequency band received through the loop 811 formed with respect to the first axis. The loops 811 and 812 formed with respect to the first axis are implemented on a board, and the loop 813 formed with respect to the second axis is implemented to be wound about a magnetic core rod.

At least a portion, for example, the loop 811, of the coil is disposed to receive the magnetic flux 801 of the first direction and a remaining portion, for example, the loop 813, of the coil is disposed to receive the magnetic flux 802 of the second direction, which is different from the first direction are disposed horizontally on the same layer.

Although the first axis is illustrated as a z axis and the second axis is illustrated as a y axis in FIGS. 7 and 8, examples are not limited thereto. The first axis and the second axis may be oriented differently as other axes.

Figure 9:
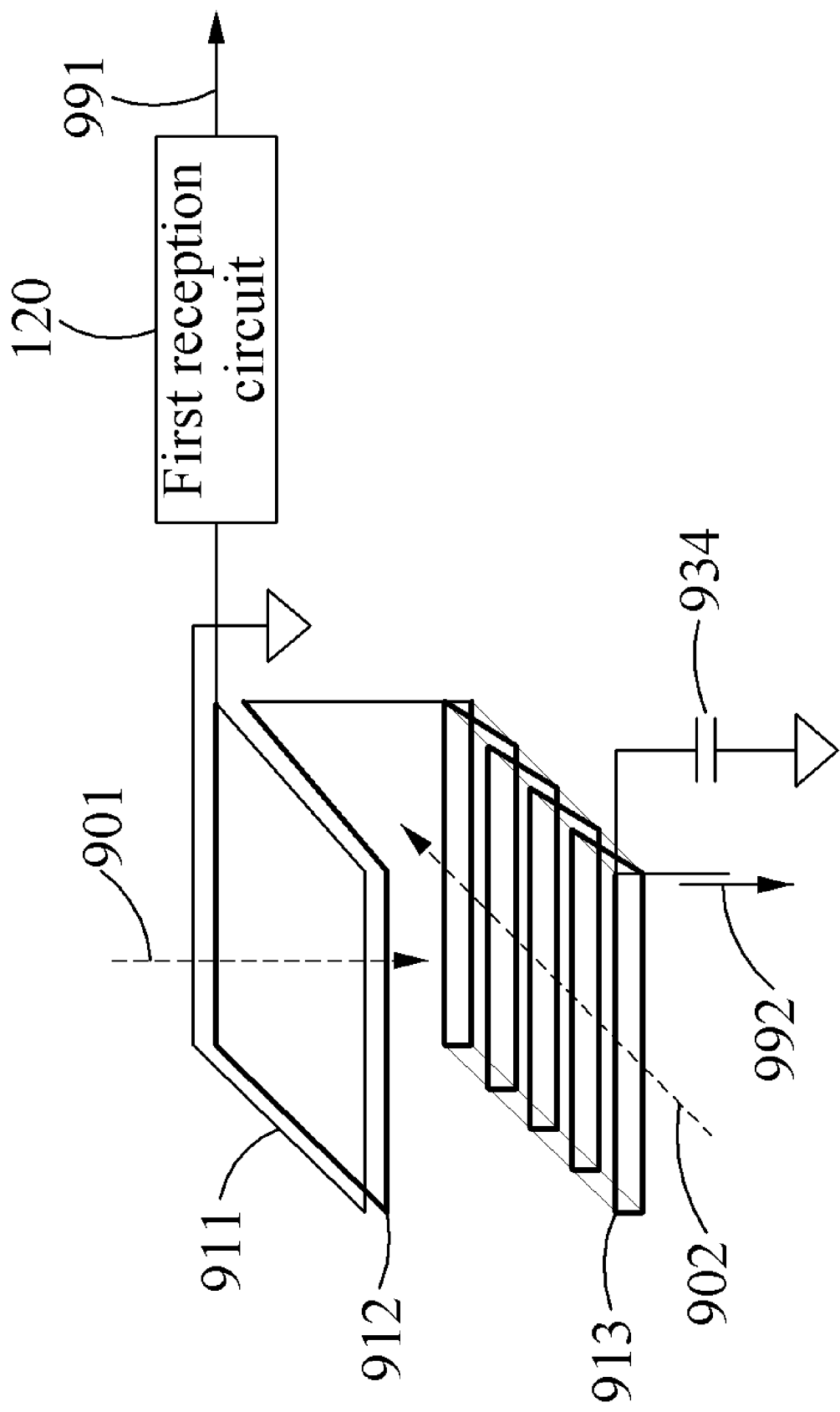

FIG. 9 illustrates an example of a coil structure of the circuit described with reference to FIGS. 5 and 6.

Loops 911, 912 and 913, magnetic flux 901 of a first direction, and magnetic flux 902 of a second direction, a signal 991 of a first frequency band, a signal 992 of a second frequency band, and the first reception circuit 120 of FIG. 9 are the same as described with reference to FIG. 7.

A first reception circuit 120 is connected to the loops 911 and 912 formed with respect to a first axis and the loop 913 formed with respect to a second axis. A coil connected to the second reception circuit 330 of FIG. 9 includes a conducting wire having a length equal to ¼ wavelength of a center frequency of the first frequency band, and the second reception circuit 330 includes a capacitor 934 connected between the coil and a ground. For example, among the plurality of loops 911, 912 and 913 of the coil, a portion of the loops 912 and 913 not connected to the first reception circuit 120, that is, the loop 913, has an impedance as the conducting wire having a length equal to ¼ wavelength of the center frequency of the first frequency band, and the corresponding conducting wire is connected to the ground through the capacitor 934. Thus, the second reception circuit 330 of the wireless device of FIG. 9 operates as the circuit of FIG. 5, and blocks the signal 991 of the first frequency band from an external signal received through the coil. In FIG. 9, the loops 911 and 912 formed with respect to the first axis and the 913 formed with respect to the second axis are magnetically isolated by a ferrite board.

Figure 10:
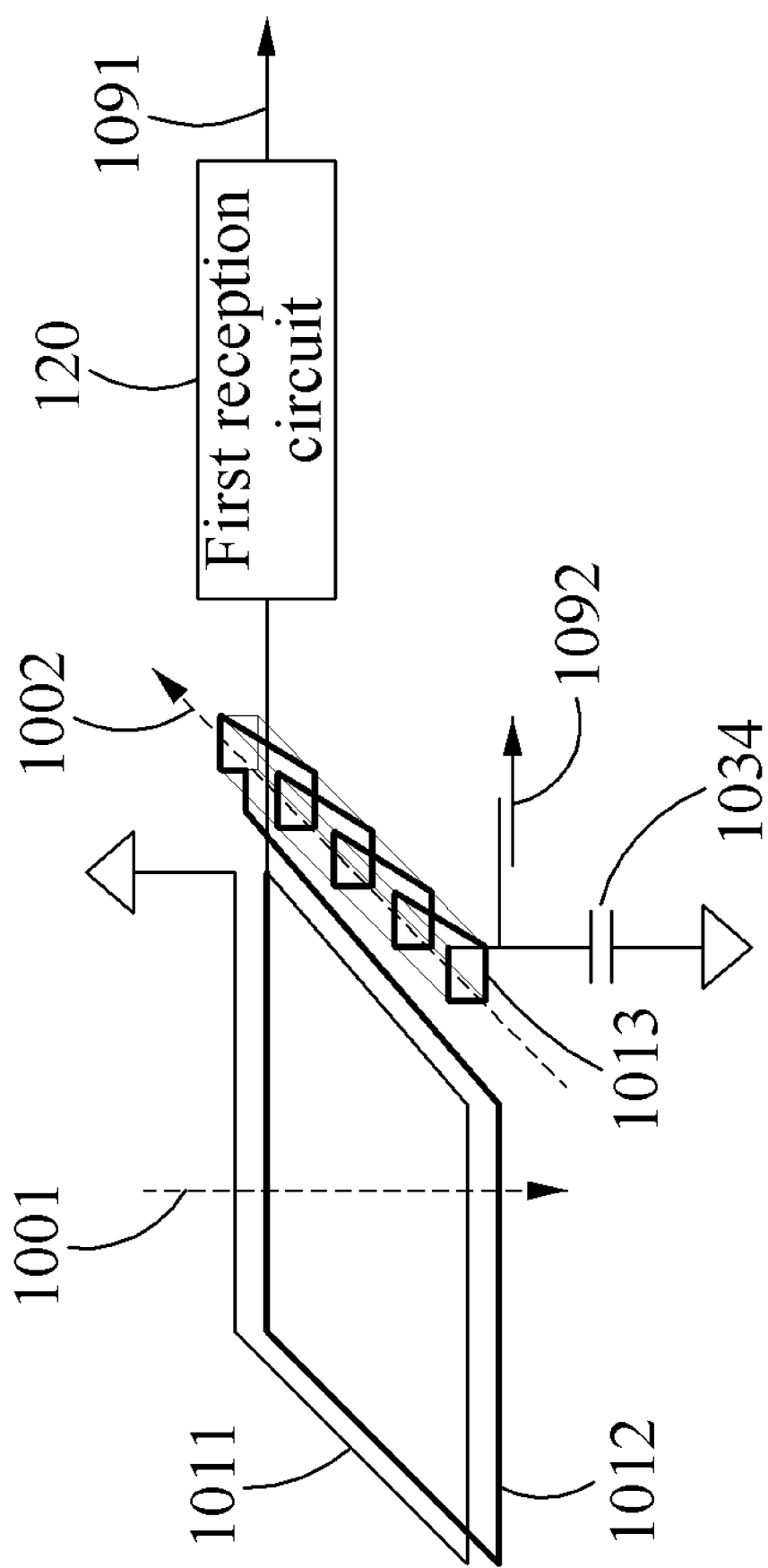

FIG. 10 illustrates an example of a coil structure of the circuit described with reference to FIGS. 5 and 6.

Loops 1011, 1012 and 1013, a magnetic flux 1001 of a first direction, and a magnetic flux 1002 of a second direction, a signal 1091 of a first frequency band, a signal 1092 of a second frequency band, and the first reception circuit 120 of FIG. 10 are the same as described with reference to FIG. 8. Further, similar to the example of FIG. 9, a coil of FIG. 10 includes a conducting wire having a length equal to ¼ wavelength of a center frequency of the first frequency band.

Similar to FIG. 9, a second reception circuit 330 includes a capacitor 1034 connected between the coil and a ground and operates as the circuit of FIG. 5 to inhibit the signal 1091 of the first frequency band and receive the signal 1092 of the second frequency band. The loops 1011 and 1012 formed with respect to the first axis are implemented on a board, and the loop 1013 formed with respect to the second axis is implemented to be wound about a magnetic core rod.

Although the first axis is illustrated as a z axis and the second axis is illustrated as a y axis in FIGS. 9 and 10, examples are not limited thereto. The first axis and the second axis may be designed as other axes.

FIGS. 11 through 14 illustrate examples of differential coil structures of wireless devices.

With regard to FIGS. 11 through 14, in each of the figures, a first portion 1111, 1211, 1311, 1411 and a second portion 1112, 1212, 1312, 1412 of a coil connected to a second reception circuit 130 are disposed to be electrically symmetric about a center point of the differential coil structure defining the first frequency band. Further, a third portion 1113, 1213, 1313, 1413 of the coil connected to the first frequency band signal (first reception circuit) is disposed at an electrical center of the coil. Thus, each portion of the coil is connected to the first reception circuit 120 and the second reception circuit 130 to be electrically symmetric about a virtual ground. The virtual ground corresponds to a central point of the coil.

Figure 11:
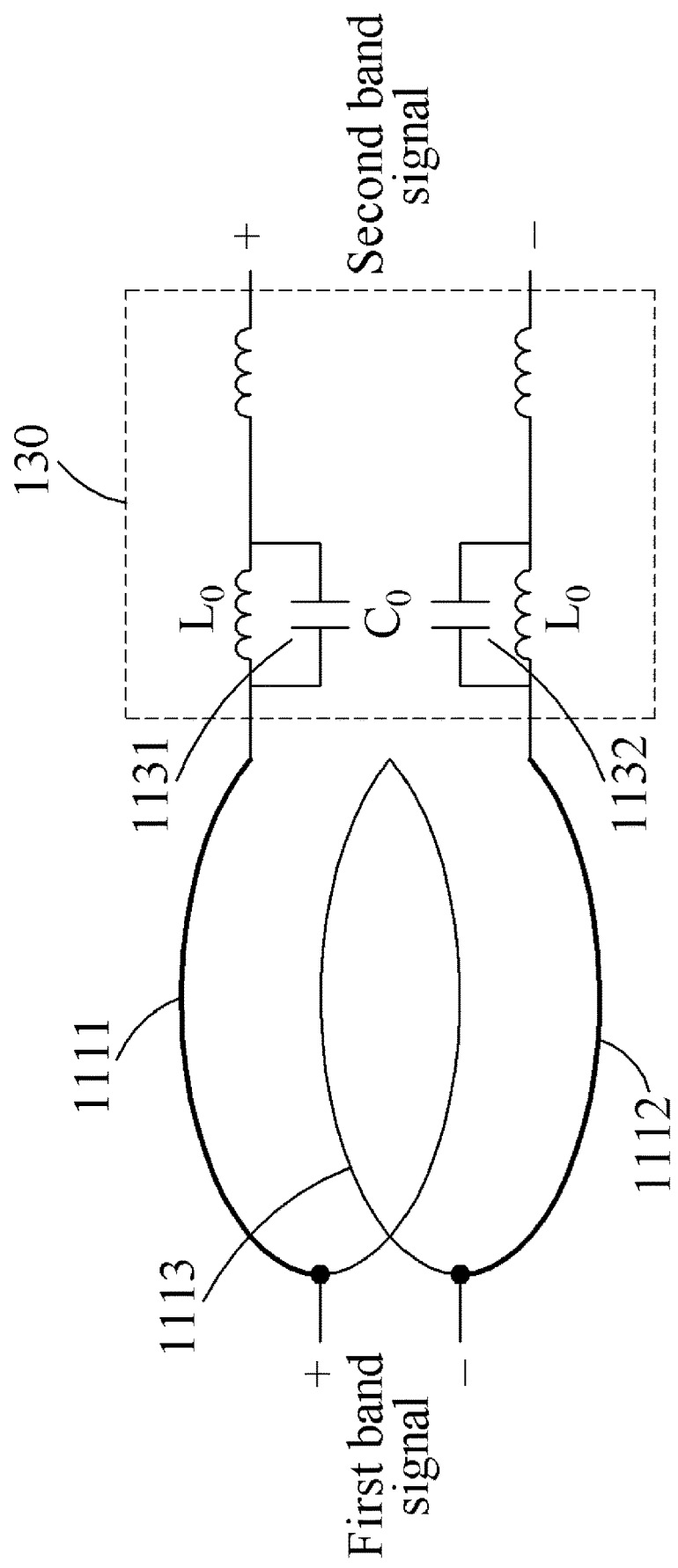
FIG. 11 illustrates an example of a differential coil structure in which a second reception circuit includes a resonant circuit.

FIG. 11 illustrates an example of a differential coil structure in which a second reception circuit 130 includes a resonant circuit.

Referring to FIG. 11, a coil includes the first portion 1111 and the second portion 1112 connected to the second reception circuit 130 through distal ends of the coil, and the third portion 1113 connected to a first reception circuit 120 at intermediate points of the first portion 1111 and the second portion 1112.

For example, the first reception circuit 120 is connected to a portion of the coil electrically symmetric about the virtual ground of the coil, for example, the third portion 1113. The second reception circuit 130 includes a first capacitor 1131 connected in parallel with at least one loop of the coil, and a second capacitor 1132 connected in parallel with at least another one loop of the coil to be electrically symmetric with the first capacitor 1131 about the virtual ground, i.e., the central point of the coil. In FIG. 11, $L_0$ denotes an inductance of the loop connected in parallel with the first capacitor 1131 or the second capacitor 1132, and $C_0$ denotes a capacitance of the first capacitor 1131 and the second capacitor 1132.

Figure 12:
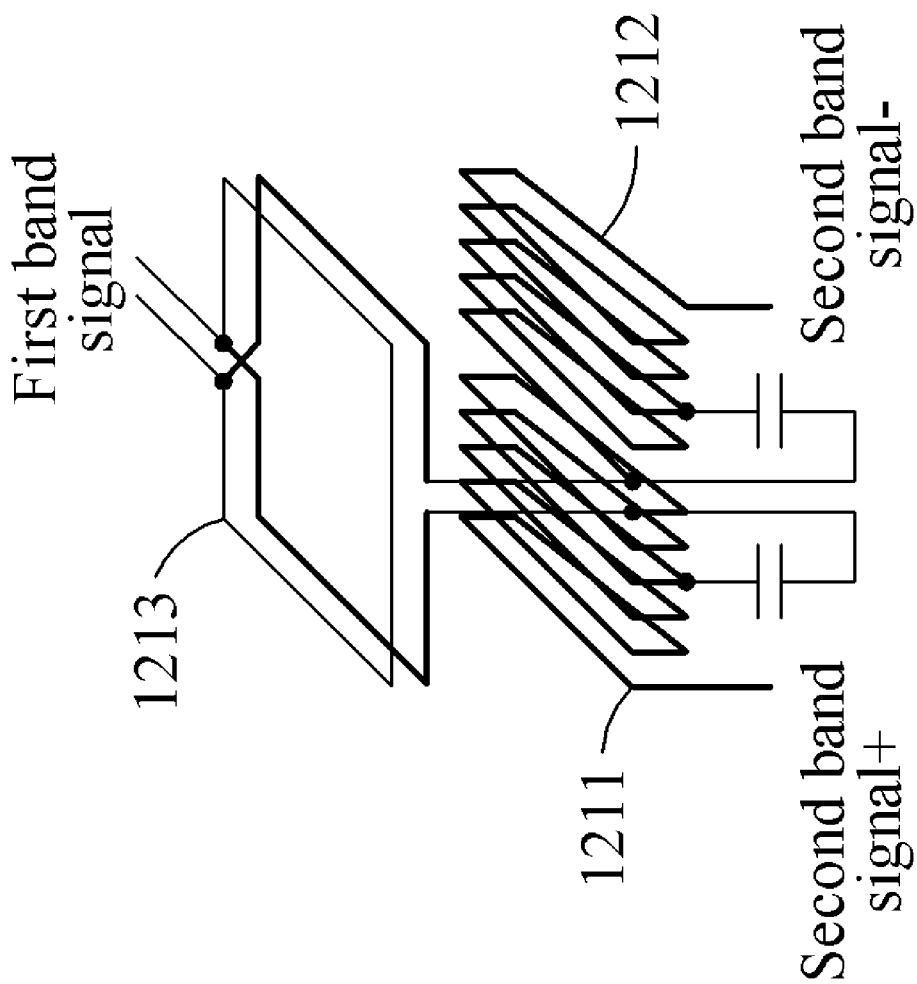
FIG. 12 illustrates an example of the coil structure of FIG. 11.

FIG. 12 illustrates an example of a coil structure implementing the circuit of FIG. 11.

Referring to FIG. 12, the first portion 1211 and the second portion 1212 of the coil are disposed to be electrically symmetric about the virtual ground, and at least one loop of the first portion 1211 and the second portion 1212 of the coil is connected in parallel with a capacitor. The third portion 1213 of the coil includes a loop electrically symmetric about the virtual ground.

Further, as shown in FIG. 12, at least one loop of the coil, for example, the third portion 1213, is disposed to receive magnetic flux of a first direction, and remaining loops of the coil, for example, the first portion 1211 and the second portion 1212, are disposed to receive magnetic flux of a second direction. The loops configured to receive magnetic fluxes of the respective directions are disposed to be electrically symmetric about the virtual ground.

Figure 13:
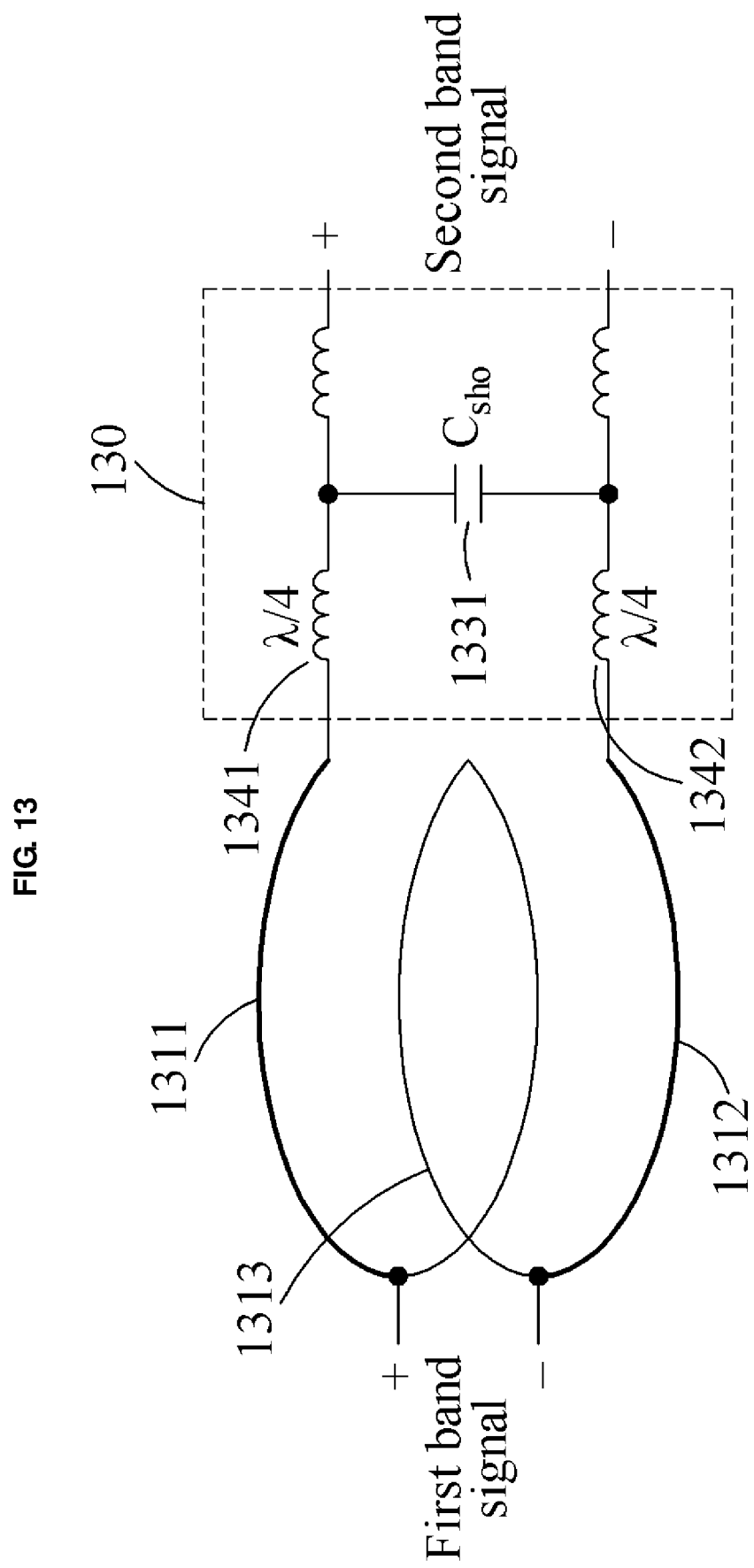
FIG. 13 illustrates an example of a differential coil structure in which a second reception circuit includes a conducting wire having a length equal a quarter wavelength.

FIG. 13 illustrates an example of a differential coil structure in which a second reception circuit 130 uses a conducting wire having a length equal to ¼ wavelength of a center frequency of a first frequency band signal.

Referring to FIG. 13, a coil includes the first portion 1311 and the second portion 1312 connected to the second reception circuit 130, and the third portion 1313 connected to a first reception circuit 120 between the first portion 1311 and the second portion 1312.

For example, the second reception circuit 130 includes a capacitor 1331 connecting two points electrically symmetric about a center of the coil corresponding to a virtual ground. A first point of the two points connected to the capacitor 1331 is at a distance away from the center of the coil corresponding to a wire having a length that's equal to ¼ wavelength of a center frequency of a first frequency band signal, for example, λ/4. A second point of the two points connected to the capacitor 1331 is at a distance away from the center of the coil, for example, a point corresponding to a virtual ground, in the opposite direction corresponding to a wire having a length that's equal to ¼ wavelength of the first frequency band signal. In FIG. 13, $C_{sho}$ denotes a capacitance of the capacitor 1331 connecting the two points. The second reception circuit 130 connects a first inductor 1341 and a second inductor 1342 through the capacitor 1331, thereby being implemented as a circuit having the impedance characteristic shown in FIG. 6.

Figure 14:
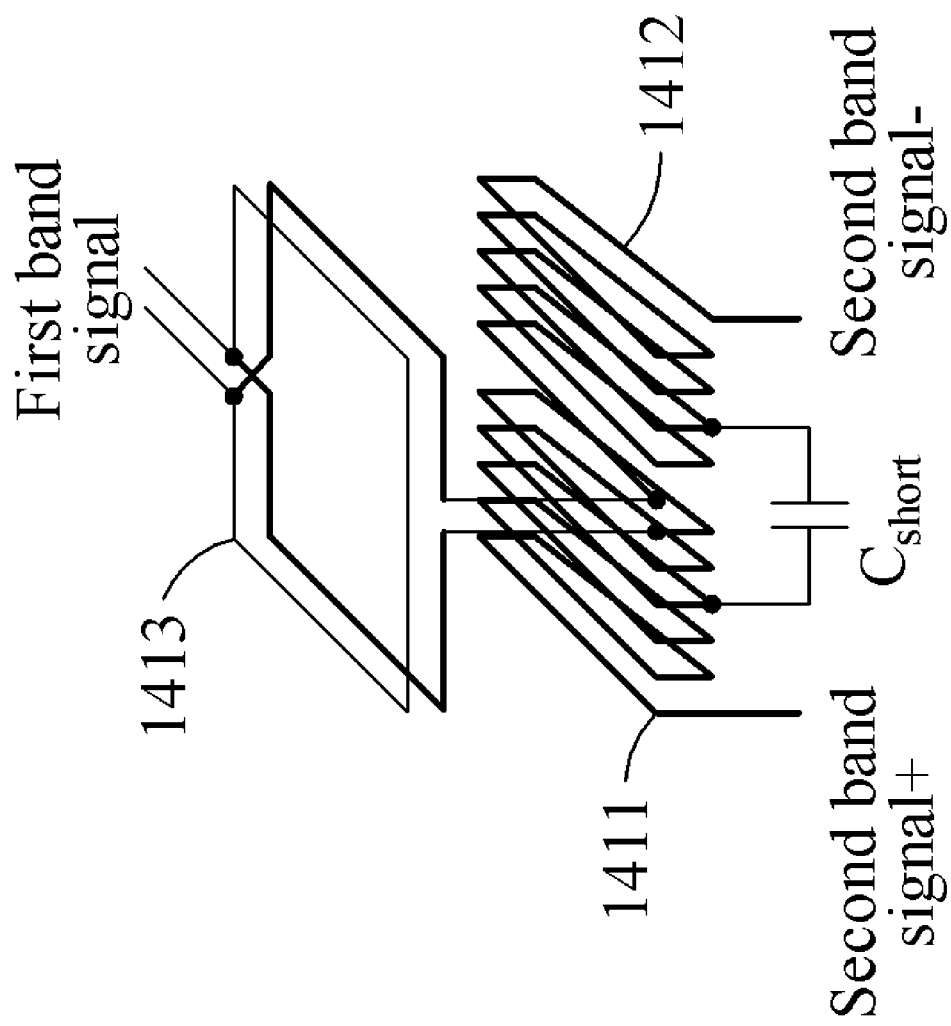
FIG. 14 illustrates an example of the coil structure of FIG. 13.

FIG. 14 illustrates an example of the coil structure of FIG. 13.

Referring to FIG. 14, the first portion 1411 and the second portion 1412 of the coil are disposed to be electrically symmetric about the virtual ground. A capacitor connects a first point of the first portion 1411 and a second point of the second portion 1412. The third point 1413 of the coil includes a loop also electrically symmetric about the virtual ground. The first point of the first portion 1411 and the second point of the second portion 1412 are similarly determined to the first point and the second point described in FIG. 13.

Further, as shown in FIG. 14, at least one loop of the coil, for example, the third portion 1413, is disposed to receive magnetic flux of a first direction, and remaining loops of the coil, for example, the first portion 1411 and the second portion 1412, are disposed to receive magnetic flux of a second direction. The loops configured to receive magnetic fluxes of the respective directions are disposed to be electrically symmetric about the virtual ground.

Figure 15:
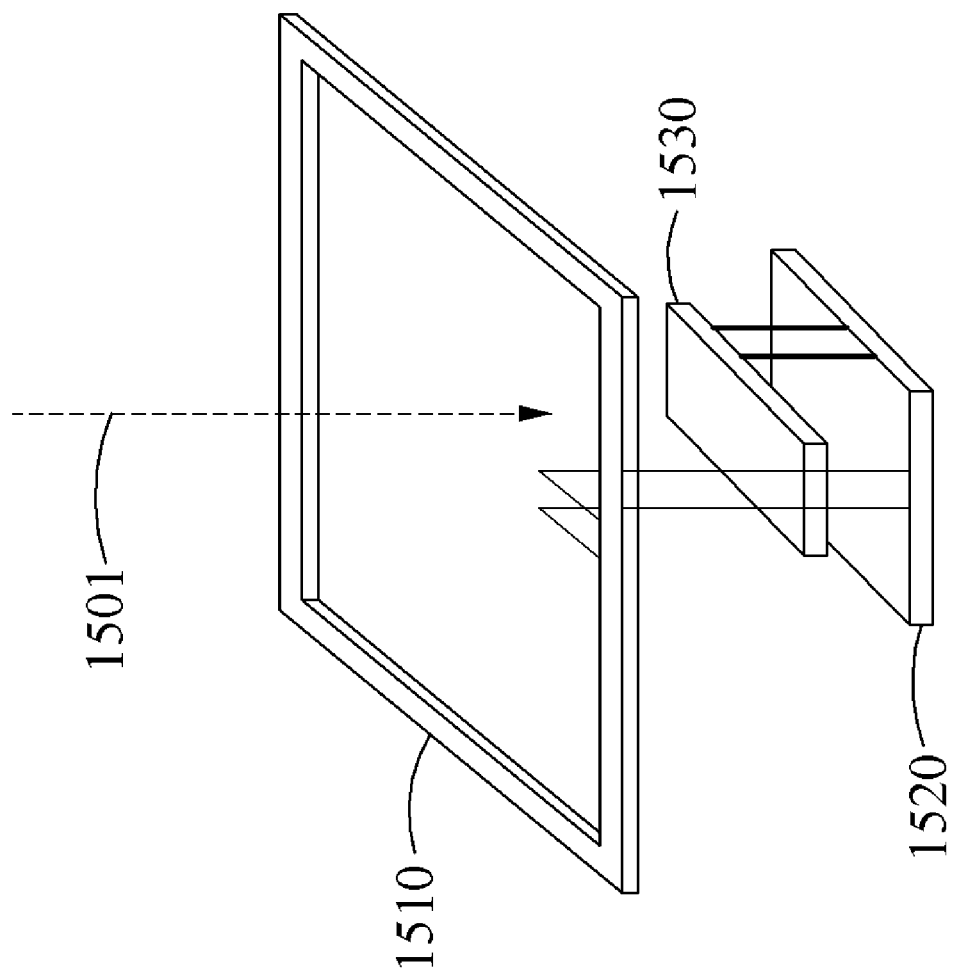
FIG. 15 illustrates an example of a configuration of a wireless device.

FIG. 15 illustrates an example of a configuration of a wireless device.

A coil 1510 of FIG. 15 is designed to receive magnetic flux 1501 of a first direction. A first reception circuit 1520 and a second reception circuit 1530 are implemented through separate chips. The first reception circuit 1520 and the second reception circuit 1530 are implemented on different boards or different layers of the same board.

Figure 16:
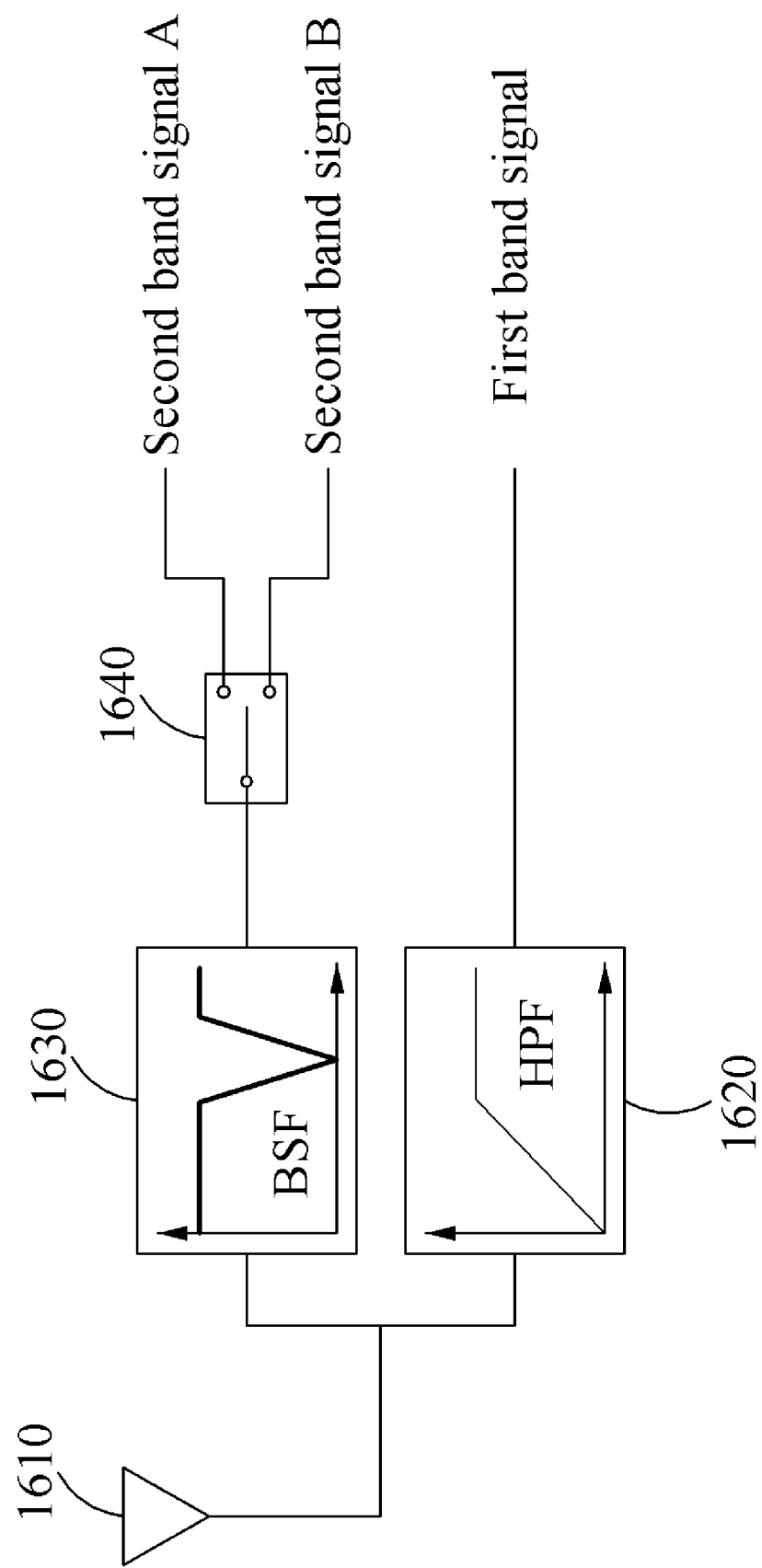
FIGS. 16 and 17 illustrate examples of configurations of first reception circuits.
Figure 17:
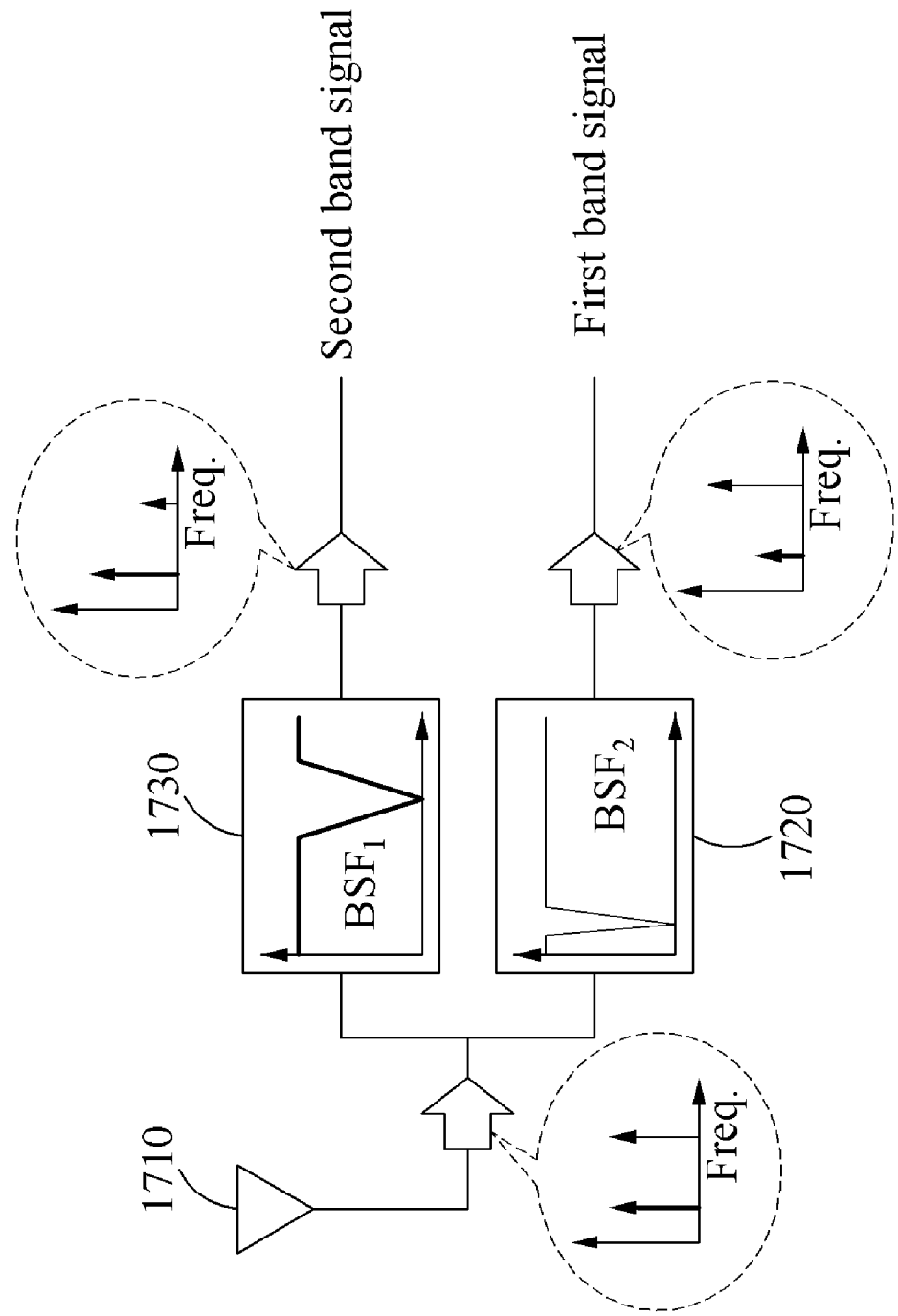

FIGS. 16 and 17 illustrate examples of configurations of first reception circuits.

FIG. 16 illustrates a configuration using a High Pass filter (HPF) as a first reception circuit 1620. The first reception circuit 1620 receives a signal of a frequency band exceeding a threshold frequency, for example, a first frequency band signal. The threshold frequency may be set to the highest frequency of a second frequency band.

A second reception circuit 1630 includes a band-stop filter (BSF), and distinguishes and receives a second frequency band signal A, for example, a wireless power transmission (WPT) signal, and a second frequency band signal B, for example, a near field communication (NFC) signal, in a second frequency band through an additional switch 1640. However, the first frequency band signal and the second frequency band signals are not limited thereto, and may be changed according to a design.

FIG. 17 illustrates a structure in which a first reception circuit 1720 and a second reception circuit 1730 each include a BSF.

A wireless device receives an external signal through an antenna 1710, for example, a coil. For example, the second reception circuit 1730 receives a signal of a second frequency band which is lower than a first frequency band through the antenna 1710. The first reception circuit 1720 blocks the signal of the second frequency band which is lower than the first frequency band through the antenna 1710.

The first reception circuit 1720 includes a BSF that prevents an inflow of wireless power into the first reception circuit 1720, the power transmitted through the second frequency band, by blocking or inhibiting the signal of the second frequency band which is distinct from the first frequency band. The second reception circuit 1730 includes a BSF that prevents an inflow of wireless data into the second reception circuit 1730, the data transmitted through the first frequency band, by blocking the signal of the first frequency band.

Figure 18:
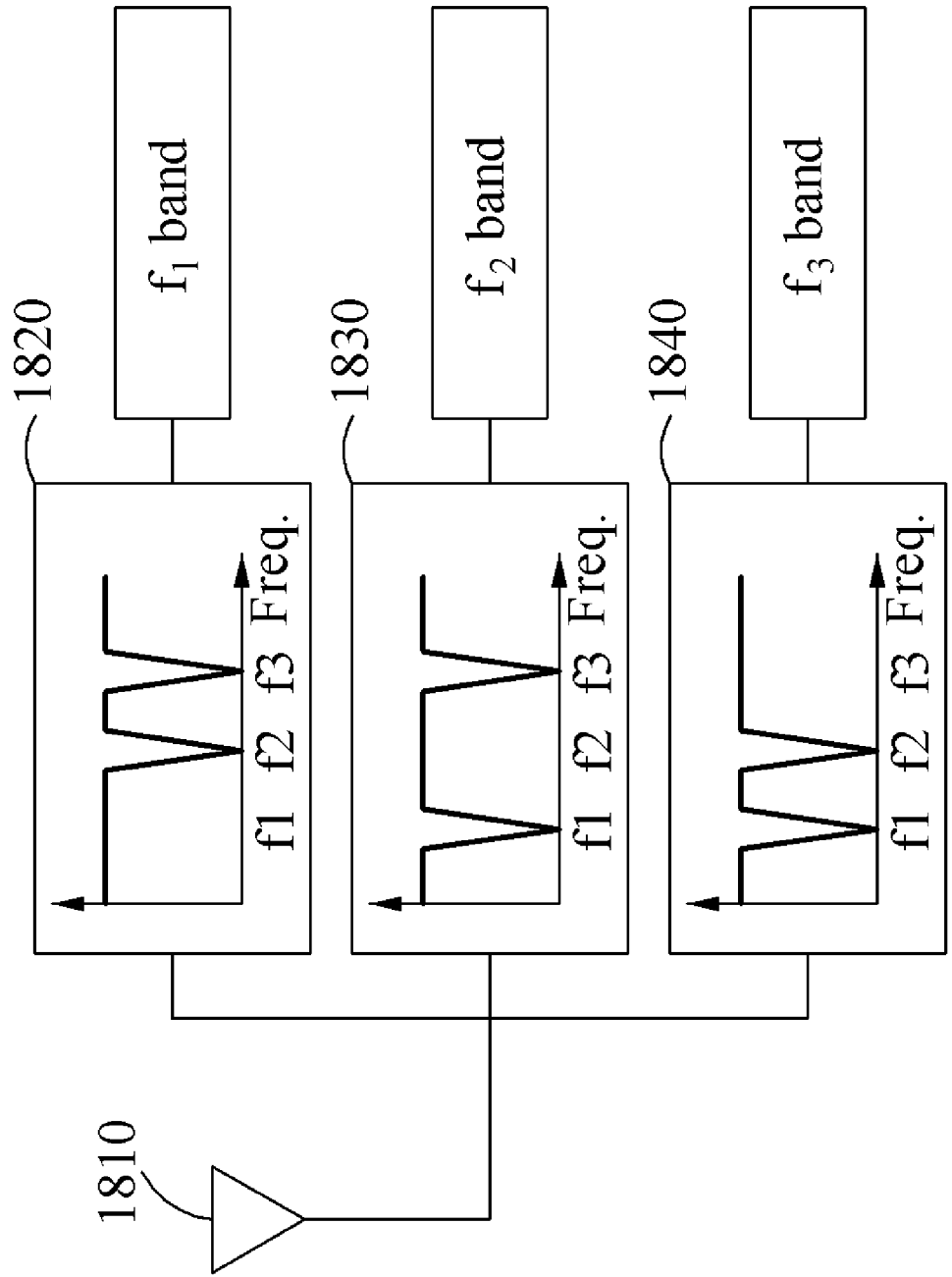
FIG. 18 illustrates an example of a wireless device including a plurality of reception circuits.

FIG. 18 illustrates an example of a wireless device including a plurality of reception circuits.

Referring to FIG. 18, a wireless device includes a coil 1810 including a plurality of loops, and a plurality of reception circuits 1820, 1830, and 1840 configured to receive external signals through the coil 1810. Each of the plurality of reception circuits 1820, 1830, and 1840 is configured to receive a signal of a frequency band designated for each of the plurality of reception circuits 1820, 1830, and 1840, and inhibits a signal of a remaining frequency band using at least a portion of the plurality of loops, among the external signals.

Although FIGS. 1 through 17 illustrate only the first reception circuit 1820 with respect to the first frequency band, for example, $f_1$ band of FIG. 18, and the second reception circuit 1830 with respect to the second frequency band, for example, $f_2$ band of FIG. 18, examples are not limited thereto. As shown in FIG. 18, the wireless device may further include a third reception circuit 1840 configured to receive a signal of a third frequency band, for example, $f_3$ band of FIG. 18, which is distinct from the first frequency band, through a portion of the plurality of loops.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

A terminal as described herein, which may be referred to as a computer terminal, may be an electronic or electromechanical hardware device that is used for entering data into and displaying data received from a host computer or a host computing system. A terminal may be limited to inputting and displaying data, or may also have the capability of processing data as well. A terminal with a significant local programmable data processing capability may be referred to as a smart terminal or fat client. A terminal that depends on the host computer or host computing system for its processing power may be referred to as a dumb terminal or thin client. A computer may run terminal emulator software that replicates the function of a terminal, sometimes allowing concurrent use of local programs and access to a distant terminal host system.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless device, comprising:
a coil comprising a plurality of loops;
a first reception circuit configured to receive a signal of a first frequency band through a portion of the plurality of loops;
a second reception circuit configured to inhibit the signal of the first frequency band through the plurality of loops; and
a portion of the coil is disposed to receive magnetic flux of a first direction, and a remaining portion of the coil is disposed to receive magnetic flux of a second direction that is orthogonal to the first direction.

2. The wireless device of claim 1, wherein the first reception circuit and the second reception circuit are connected to the coil to share at least a portion of the coil.

3. The wireless device of claim 1, wherein the second reception circuit is configured to receive a signal of a second frequency band, the second frequency band being lower than the first frequency band.

4. The wireless device of claim 1, wherein the first reception circuit is configured to inhibit a signal of a second frequency band, the second frequency band being lower than the first frequency band.

5. The wireless device of claim 1, wherein the coil comprises a first loop configured to receive the magnetic flux of the first direction and a second loop configured to receive the magnetic flux of the second direction, and
the second reception circuit is configured to inhibit the signal of the first frequency band from an external signal received through the coil, using the second loop.

6. The wireless device of claim 1, wherein the first reception circuit comprises a band-stop filter (BSF) configured to prevent an inflow of wireless power into the first reception circuit, the power transmitted through the second frequency band, by blocking a signal of a second frequency band which is distinct from the first frequency band.

7. The wireless device of claim 1, wherein the second reception circuit comprises a band-stop filter (BSF) configured to prevent an inflow of wireless data having a frequency in the first frequency band from flowing into the second reception circuit by inhibiting frequencies of the first frequency band.

8. The wireless device of claim 1, wherein the second reception circuit is configured to prevent current flow corresponding to the signal of the first frequency band, and to pass current flow corresponding to a signal of a second frequency band which is distinct from the first frequency band.

9. The wireless device of claim 1, wherein the first reception circuit is configured to pass current flow corresponding to the signal of the first frequency band, and prevent current flow corresponding to a signal of a second frequency band which is distinct from the first frequency band.

10. The wireless device of claim 1, wherein the second reception circuit comprises a circuit configured to operate as an impedance value greater than a threshold impedance value in response to reception of the signal of the first frequency band, and operate as an impedance value less than or equal to the threshold impedance in response to reception of a signal distinct from the first frequency band.

11. The wireless device of claim 1, wherein the second reception circuit comprises a resonant circuit having a center frequency of the first frequency band as a resonant frequency.

12. The wireless device of claim 1, wherein the second reception circuit comprises:
a conducting wire having a length equal to a quarter-wavelength of a center frequency of the first frequency band, and connected to the plurality of loops; and
a capacitor connected between the conducting wire and a ground.

13. The wireless device of claim 1, wherein the coil comprises a conducting wire having a length equal to a quarter-wavelength of a center frequency of the first frequency band.

14. The wireless device of claim 1, wherein a first portion and a second portion of the coil connected to the second reception circuit are disposed to be electrically symmetric about the first reception circuit, and
a third portion of the coil connected to the first reception circuit is disposed at an electrical center of the coil.

15. The wireless device of claim 1, wherein the first reception circuit is connected to a portion of the plurality of loops electrically symmetric about a virtual ground of the coil, and
the second reception circuit comprises a capacitor configured to connect two points electrically symmetric about the virtual ground of the coil.

16. The wireless device of claim 1, wherein the first reception circuit is connected to a portion of the plurality of loops electrically symmetric about a virtual ground of the coil, and
the second reception circuit comprises a first capacitor connected in parallel with at least one loop of the coil, and a second capacitor connected in parallel with at least another loop of the coil such that the first capacitor and the second capacitor are electrically symmetric about the virtual ground.

17. The wireless device of claim 1, further comprising:
a third reception circuit configured to receive a signal of a third frequency band through the portion of the loops, the third frequency band being different from the first frequency band.

18. The wireless device of claim 1, wherein the first reception circuit is connected to the portion of the plurality of loops, and
the second reception circuit is connected to the coil to share at least another portion of the portion of the plurality of loops with the first reception circuit.

19. The wireless device of claim 1, wherein the portion of the coil is disposed on a first layer of a circuit board, and
the remaining portion of the coil is disposed on a second layer of the circuit board that is distinct from the first layer.

20. The wireless device of claim 19, wherein the second layer comprises a magnetic material that disrupts a flow of a magnetic flux.

21. The wireless device of claim 19, wherein the second layer is disposed between a third layer and the first layer to magnetically isolate the third layer and the first layer.

22. The wireless device of claim 1, wherein the portion of the coil is disposed to receive magnetic flux of a first direction and the remaining portion of the coil is disposed to receive magnetic flux of a second direction that is different from the first direction, and
the portion of the coil and the remaining portion of the coil are disposed horizontally on the same layer.

23. The mobile device of claim 1, wherein the second reception circuit has a relative minimum frequency response at the first frequency band.

24. The wireless device of claim 3, wherein the first reception circuit is further configured to isolate the signal of the second frequency band, and the second reception circuit is further configured to isolate the signal of the first frequency band.

25. A wireless device, comprising:
a coil comprising a plurality of loops; and
a plurality of reception circuits configured to receive external signals through the coil,
wherein each of the plurality of reception circuits is configured to receive a signal of a frequency band designated for each of the plurality of reception circuits, and to inhibit a signal of a non-designated frequency band using at least a portion of the plurality of loops, and
wherein a portion of the coil is disposed to receive magnetic flux of a first direction, and a remaining portion of the coil is disposed to receive magnetic flux of a second direction that is orthogonal to the first direction.

26. A wireless device, comprising:
a coil comprising a first loop and a second loop,
the first loop of the coil is coupled to a first reception circuit to receive a first set of frequencies of the frequency band,
the second loop of the coil is coupled to a second reception circuit to inhibit the first set of frequencies, and
wherein the second reception circuit is a resonant circuit, and
wherein the first loop is disposed to receive magnetic flux of a first direction, and the second loop is disposed to receive magnetic flux of a second director that is orthogonal to the first direction.

27. The wireless device of claim 26, wherein a third loop of the coil is coupled to a third reception circuit to receive a third set of frequencies of the frequency band.

28. The wireless device of claim 26, wherein the first loop is configured to receive wireless power and the second loop is configured as an RF antenna.

29. The wireless device of claim 28, wherein the wireless device is a mobile device.

\* \* \* \* \*